(12) United States Patent
Alic et al.

(10) Patent No.: US 10,243,690 B2
(45) Date of Patent: *Mar. 26, 2019

(54) METHOD AND A SYSTEM FOR A RECEIVER DESIGN IN BANDWIDTH CONSTRAINED COMMUNICATION SYSTEMS

(71) Applicant: SANS R&D, LLC, La Jolla, CA (US)

(72) Inventors: Nikola Alic, La Jolla, CA (US); John G. Proakis, Winchester, MA (US)

(73) Assignee: SANS R&D, LLC, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,527

(22) Filed: Jul. 2, 2018

(65) Prior Publication Data

US 2018/0316459 A1 Nov. 1, 2018

Related U.S. Application Data

(63) Continuation of application No. 14/206,427, filed on Mar. 12, 2014, now Pat. No. 10,020,912.

(Continued)

(51) Int. Cl.
*H04L 1/00* (2006.01)
*H04L 29/06* (2006.01)
(Continued)

(52) U.S. Cl.
CPC .......... *H04L 1/0006* (2013.01); *H04L 1/0009* (2013.01); *H04L 1/0045* (2013.01);
(Continued)

(58) Field of Classification Search
CPC ....... H04L 1/04; H04L 1/0054; H04L 1/0056; H04L 1/0071; H04J 13/10
(Continued)

(56) References Cited

U.S. PATENT DOCUMENTS 4,888,775 A 12/1989 Karabed et al.
5,031,193 A 7/1991 Atkinson et al.
(Continued)

FOREIGN PATENT DOCUMENTS

EP 0677965 A2 10/1995
WO 2005015750 A1 2/2005
(Continued)

OTHER PUBLICATIONS

Bahl et al., "Optimal Decoding of Linear Codes for Minimizing Symbol Error Rate (Corresp.)," IEEE Xplore Digital Library, Information Theory, IEEE Transactions, Mar. 1974, Abstract only, vol. 20, Issue: 2.

(Continued)

*Primary Examiner* — Leila Malek
(74) *Attorney, Agent, or Firm* — The Mueller Law Office, P.C.

(57) ABSTRACT

The present invention relates to a method of improving the performance in bandwidth constrained communication systems while reducing the complexity of the equalizer used for information retrieval, as well as to improving the capacity of communication systems. These properties are achieved by appropriate information encoding, prior to signal shaping before transmission, whereas the equalizer complexity is reduced by applying the intersymbol interference shortening filter prior to the information retrieving equalization. A proper combination of the recounted elements is capable of providing a qualitatively improved and previously unsuspected performance, as compared to its constituent elements.

18 Claims, 4 Drawing Sheets

Related U.S. Application Data (60) Provisional application No. 61/780,918, filed on Mar. 13, 2013.

(51) Int. Cl.
  *H04L 25/02* (2006.01)
  *H04L 25/03* (2006.01)

(52) U.S. Cl.
  CPC .... *H04L 25/0216* (2013.01); *H04L 25/03171* (2013.01); *H04L 69/04* (2013.01)

(58) Field of Classification Search
  USPC ........................................................ 375/259
  See application file for complete search history.

(56) References Cited

U.S. PATENT DOCUMENTS

| | | | |
|---|---|---|---|
| 5,430,744 | A | 7/1995 | Fettweis et al. |
| 5,432,818 | A | 7/1995 | Lou |
| 5,757,855 | A | 5/1998 | Strolle et al. |
| 5,812,602 | A | 9/1998 | Humblet |
| 6,269,129 | B1 | 7/2001 | Rhee et al. |
| 6,377,529 | B1 | 4/2002 | Lee et al. |
| 6,385,255 | B1 | 5/2002 | McLaughlin et al. |
| 6,625,236 | B1 | 9/2003 | Dent et al. |
| 7,012,974 | B1 | 3/2006 | Liu et al. |
| 7,180,955 | B2 | 2/2007 | Onggosanusi et al. |
| 7,205,912 | B1 | 4/2007 | Yang et al. |
| 7,257,172 | B2 | 8/2007 | Okamoto et al. |
| 7,839,924 | B2 | 11/2010 | Yamaguchi |
| 7,852,965 | B2 | 12/2010 | Feller |
| 8,155,130 | B2 | 4/2012 | McGrew et al. |
| 8,595,590 | B1 | 11/2013 | Vojcic et al. |
| 2002/0019966 | A1 | 2/2002 | Yagil et al. |
| 2003/0161062 | A1 | 8/2003 | Akamatsu |
| 2003/0231709 | A1 | 12/2003 | Pare et al. |
| 2005/0058089 | A1 | 3/2005 | Vijayan et al. |
| 2006/0050803 | A1 | 3/2006 | Barnes et al. |
| 2007/0210943 | A1 | 9/2007 | Tropf |
| 2008/0002652 | A1 | 1/2008 | Gupta et al. |
| 2010/0020854 | A1 | 1/2010 | He et al. |
| 2010/0104041 | A1 | 4/2010 | Ibi et al. |
| 2012/0027132 | A1* | 2/2012 | Rouquette ............ H04L 27/14 375/334 |
| 2012/0213267 | A1 | 5/2012 | Stojanovic et al. |
| 2013/0170842 | A1 | 7/2013 | Koike-Akino et al. |
| 2013/0332790 | A1 | 12/2013 | Lu et al. |

FOREIGN PATENT DOCUMENTS

| | | |
|---|---|---|
| WO | 2010066778 A1 | 6/2010 |
| WO | 2013101583 A1 | 7/2013 |

OTHER PUBLICATIONS

Benedetto et al., "A Soft-Input APP Module for Iterative Decoding of Concatenated Codes," IEEE Communications Society Digital Library, http://dl.comsoc.org/comsocdl/, 1997, Abstract only.

Notice of Allowance dated Mar. 13, 2018 for U.S. Appl. No. 14/206,427.

Office Action dated Oct. 30, 2017 for U.S. Appl. No. 14/206,427.

Souvignier et al., "Turbo Decoding for Partial Response Channels," IEEE Xplore Digital Library, Communications, IEEE Transactions, Aug. 2000, Abstract only, vol. 48, Issue: 8.

* cited by examiner

METHOD AND A SYSTEM FOR A RECEIVER DESIGN IN BANDWIDTH CONSTRAINED COMMUNICATION SYSTEMS

CROSS-REFERENCE TO RELATED APPLICATIONS

The application is a continuation of U.S. patent application Ser. No. 14/206,427 filed on Mar. 12, 2014, and entitled "Method and a System for a Receiver Design in Bandwidth Constrained Communication Systems"; which claims the benefit of U.S. Provisional Application Ser. No. 61/780,918 filed on Mar. 13, 2013, and entitled "Method and a System for a Receiver Design in Bandwidth Constrained Communication Systems"; all of which are hereby incorporated by reference for all purposes.

FIELD OF THE INVENTION

The invention relates generally to communication systems and more particularly to detection in bandwidth constrained communication systems. The invention is specifically aimed at availing both an improved performance in spectrally efficient bandwidth constrained communication systems, as well as at simplifying the receiver structure in these systems. The method is of particular interest for bandwidth constrained or narrowly filtered communication systems.

BACKGROUND OF THE INVENTION

Bandwidth constrained or narrowly filtered communication systems are defined in U.S. Pat. No. 8,155,530 to Alic et al., incorporated herein by this reference.

Ability to reliably transmit a high quantity of information over a given bandwidth is the single most important aim of communication systems. In designing the communication systems, predominantly modulation formats without memory are used. As is well known, these systems, often based on quadrature amplitude modulation (QAM) cannot reach theoretical bounds of spectral efficiency. On the other hand, when mated with very sophisticated encoding schemes that jointly optimize the modulation and error control coding (ECC), communication systems without memory are known to perform closer to the theoretical bounds. The error-control codes append redundant information bits, or symbols, so as to achieve resilience and/or an improved performance in the presence of hindrances in the process of the information transfer, such as noise and distortions. Specifically, it has recently been demonstrated that utilization of more than one error control code, in the encoding process, in a construction best described as multiple level information protection, can yield an improved performance, especially if mated with the so called iterative decoding, in which the reliability estimates on the received information symbols are exchanged between the constituent codes' decoders multiple times, with an improved estimate on the information symbols being obtained with each additional iteration. In particular, in the context of iterative decoding, it is often said, owing to the particular encoding implementation that the constituent codes are concatenated. In particular, the process of concatenation is achieved by constructs called interleavers that in effect permute the order of either the input information symbol prior to encoding, or permute the order of encoded information symbols. Conversely, the action of restoring the input information order is achieved by de-interleavers at the receiving end. The process of iterative decoding encompasses the interleaving and the de-interleaving process in that passing of the codewords between multiple constituent decoders is assumed to include the permutation of the relevant information symbols so as to be corresponding to the pertinent constituent codes.

The key aspect of the present invention is that if bandwidth constriction (or introducing memory into the communication system by design) is used appropriately in conjunction with error control coding—a novel, previously unsuspected quality is attained in that the described simple arrangement can operate even closer to the theoretical bounds than the systems mentioned above. Thus, the main characteristic of the present invention is its ability to provide outstanding performance and capacity, based on a simpler design than existing communication systems' concepts. On the other hand, bandwidth constrained communication systems rely on equalization to mitigate the effect of bandwidth limitation. In particular, the systems with high spectral efficiency, or equivalently—a considerable amount of bandwidth limitation, can be affected by significant extension of the channel response duration, thus requiring long, and/or complex equalization structures to appropriately handle the effects of the induced intersymbol interference. Complex equalizers not only contribute to a significant complexity increase and difficult practical realization, but also increase the overall system power consumption. Consequently, the existing solutions fail to meet the industry needs since, for high spectral efficiencies, they result in both an inferior performance, as well as in overly intricate, and thus highly power hungry solutions.

Currently there are a number of solutions for improving capacity (i.e. the amount of information reliably transmittable over a given bandwidth). Some of these solutions attempt to utilize modulation formats without memory, such as QAM, mentioned above, but these solutions fail to meet the needs of the industry because QAMs cannot operate close enough to the theoretical bounds. Other solutions attempt to use specific (i.e. redundant) encoding for information in order to improve performance, but these solutions are similarly unable to meet the needs of the industry because they still cannot provide adequate performance. Still other solutions seek to jointly optimize modulation and error control coding (ECC) by means of e.g., trellis coded modulation, but these solutions also fail to meet some specific industry needs because of the associated complexity of that solution.

The narrowly filtered, or bandwidth constrained systems with high spectral efficiency necessarily need to rely on equalization for information retrieval from severely distorted information-bearing waveforms at the receiving end of the link. In addition there exist a number of solutions for equalization in digital communication systems affected by intersymbol interference. Some of these solutions attempt to mitigate the effects of intersymbol interference by equalization that corresponds to the full extent of the channel response duration (in terms of the number of symbol slots affected by intersymbol interference), but these solutions fail to meet the needs of the industry because a direct equalization often yields complex equalization structures. Other solutions attempt to use simpler equalization structures, but these solutions are similarly unable to meet the needs of the industry because they do not provide satisfactory performance.

The overall performance and the underlying complexity of the equalizer used in communication systems represent critical concerns in their practical realization, and are of particular importance for high speed systems. The said properties translate to both higher reliability and/or capacity in communication systems, as well as a lower receiver and system overall power dissipation and an easier practical implementation. Consequently, there currently exists a clear need in the industry for means of improving the performance and capacity of communication systems, in addition to reducing the complexity of the underlying digital receivers.

In that respect, it would be desirable to have a composition that can have a simpler design than the existing ones which/that can be used to provide performance close to the theoretical bounds. Still further, it would be desirable to have a compound that can be used as an add-on solution to the existing systems and provide them with a superior performance.

In that respect, it would be desirable to have a composition that avails an improved performance and/or capacity which has a limited complexity. It would be desirable to have a composition that can have a simpler design than the existing ones which/that can be used to provide performance close to the theoretical bounds. Furthermore, it would also be desirable to have a composition whose practical implementation is straightforward. Still further, it would be desirable to have a compound that can be used as an add-on solution to the existing systems and provide them with a superior performance. Furthermore, it would be desirable to have a compound that introduces a low latency in processing. In summary, there currently exists a need in the industry for a composition that is instrumental in providing an improved performance while forgoing a complex equalization structure and is, yet, capable of handling large amounts of intersymbol interference with limited penalties.

SUMMARY OF THE INVENTION

The present invention advantageously fills the aforementioned deficiencies by uniquely providing a superior system performance, with lower complexity, latency and power dissipation, and includes a specific receiver design comprising an equalizer, an optional pre-processing approach applied to the incoming waveforms, or samples, which avails utilization of a lower complexity information retrieving equalizer, as well as the error control coder and decoder matched to the bandwidth constrained channel. The present invention is a method for the receiver design in bandwidth restricted communication systems which by an appropriate combination of equalization and error control coding qualitatively improves the overall system performance and capacity. The present invention also employs a digital reshaping at the receiver in a specific way, so as to avail utilization of lower complexity information retrieving equalizers in the receiver processing chain. The invention, broadly, consists of the following steps: (1) shortening of the channel response by means of a specific signal processing step; (2) equalization, or information retrieval by an appropriate equalizer and (3) error control decoding. Specifically in the case of time-varying channels, an update of the channel response shortening action accomplishing the target response, as well as the information retrieving equalizer, to the best of ability, or according to an optimization of a certain criterion might have to be performed periodically.

The present invention is unique in that it is different from other known processes or solutions. More specifically, the present invention owes its uniqueness to the fact that it: (1) encompasses a particular combination of processing steps (i.e. error control coding in bandwidth constricted systems, intersymbol interference shortening and trellis-based equalization) that provides a qualitatively novel and improved, previously unsuspected, system performance; (2) enables a significant complexity reduction of the information retrieving equalizer by introducing a pre-processing step of signal reshaping.

Among other things, it is an object of the present invention to improve the overall system performance in highly spectrally efficient bandwidth restricted communication systems.

It is further an objective of the present invention to adjust the received waveforms in bandwidth constrained communication systems by adaptive digital processing in a way that shortens the channel response duration in terms of the number of symbol slots that at the same time does not suffer from any of the problems or deficiencies associated with prior solutions.

Figure 1:
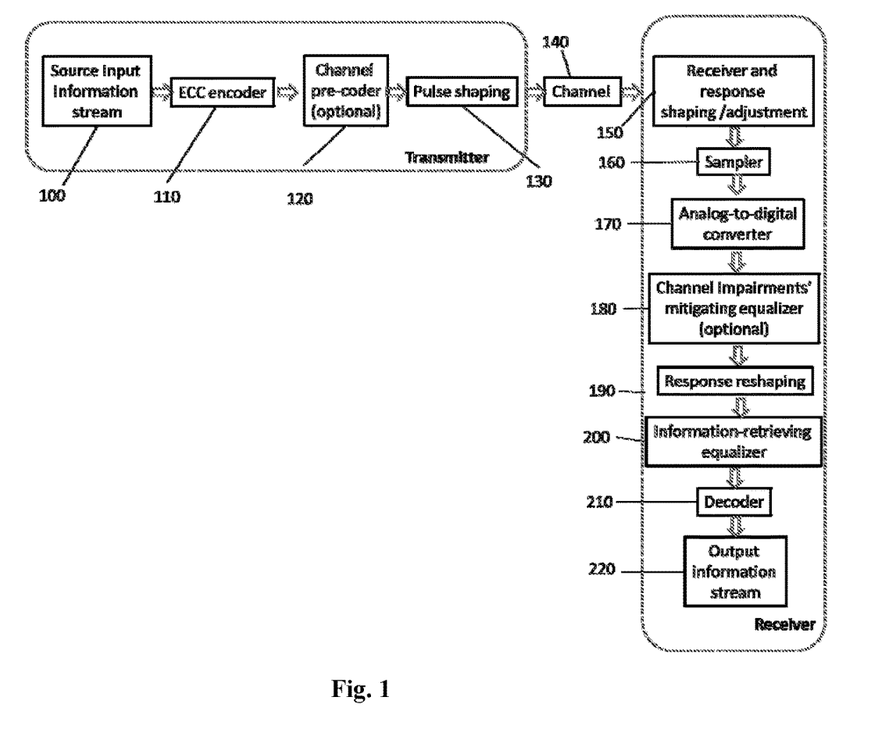
FIG. 1 illustrates a general schematic of a digital communication system.

It is still further an object of the present invention to significantly simplify the information retrieving equalization which is performed later in the receiver processing chain (as shown in FIG. 1, below).

Further still, it is an object of the present invention to reduce the power dissipation of the receiver.

BRIEF DESCRIPTION OF THE DRAWINGS

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The present invention is directed at improving the performance of bandwidth constrained systems and/or capacity of communication systems in general.

In the preferred embodiment of the invention, the information is encoded by error-control redundant symbols having what is known as concatenated 'turbo' structure (see FIG. 1), prior to the waveform shaping. The shaping of the waveforms to be transmitted intentionally introduces memory into the transmitted signals. At the receiving end, after several standard processing steps, the encoded information corrupted after transmission through the channel is estimated by an information retrieving block that is implemented as a maximum a posteriori (i.e. BCJR) equalizer and is passed to the decoding block which iteratively improves the estimates of the received data, whereas the estimates can further be improved by including the information retrieving equalizer into the iterative detection. As a final outcome, after a sufficient number of iterations, the highly reliable information symbols emanating from the iterative decoding and detection process are output as the received information/data.

It ought to be emphasized that both of the key components of the present inventions have been known in the past (i.e. bandwidth constriction and error control coding). What makes the present invention unique is a novel scientific finding that a particular combination of the noted components can produce previously unsuspected and certainly never before demonstrated performance. In that respect, the present invention is based on a novel rigorously obtained theoretical result marking a sharp difference to the previous similar and dissimilar system implementations.

In an alternative embodiment an additional processing step can be adopted prior to the information retrieving equalizer. The purpose of the additional processing step is to shorten the channel response, and, thus avail utilization of a less complex information-retrieving equalizer. The response shortening processor is in a preferred embodiment realized as a finite impulse response filter, however other similar approaches achieving the same effect and for the same purpose can easily be conceived by those skilled in the present art. If the alternative embodiment is adopted, the information retrieving equalizer can be designed to accommodate for correlated noise, either directly, or by adopting a noise whitening filter preceding it.

In yet another embodiment, the ECC is chosen to be a turbo code with parallel concatenation, or, alternatively a low-density parity check code, whereas the decoding is declared terminated after a sufficient number of decoding iterations, including a possible additional outer code protecting against a possible error floor formation.

In an alternative embodiment the information retrieval can be performed with information retrieving equalizer as an integral part of the iterative decoder, with the reliabilities of the information symbols iteratively exchanged between the decoder and the information retrieving equalizer. In this case, an optional recursive pre-coder can be included into the communication system, prior to the waveform shaping at the transmitter.

In another instance the information retrieving equalizer can be implemented as a soft output Viterbi detector, or any simplification of the aforementioned algorithms/approaches, including the application of the "per survivor" processing.

Referring to the figures, FIG. 1 shows a general schematic of a digital communication system. In general, a communication system comprises of a transmitter, channel 140 and receiver blocks. Within the transmitter, the following parts are discernible: Input information stream (100), an error control encoder (110), followed by an optional channel pre-coder (120), as well as the pulse-shaping block (130), responsible for shaping of the transmitted information—bearing waveforms. The receiver, on the other hand, comprises: a receiving filter (150), a sampler (160), an analog-to-digital converter (170), a channel impairments' mitigating equalizer (180), a channel response reshaping block at which the present invention is primarily aimed at (190), an information—retrieving equalizer (200), a decoder (210), concluding with an output information stream (220).

Figure 2:
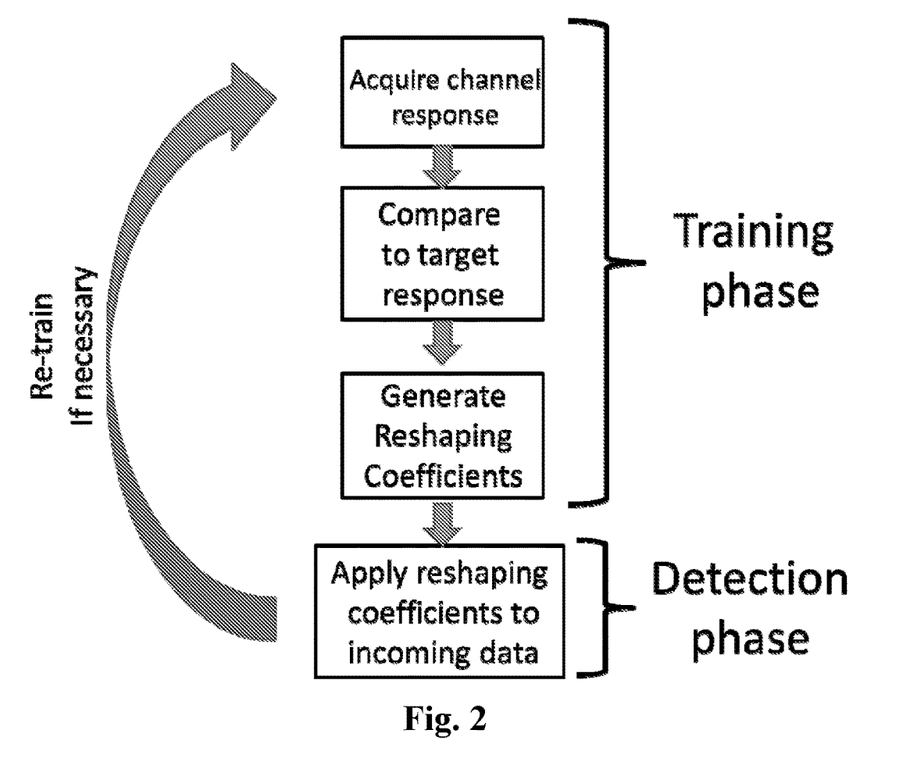
FIG. 2 shows an example flow chart of channel response reshaping.

FIG. 2 shows an exemplary flow diagram of the channel adjustment block. The operation of the channel adjustment block comprises of two phases: (i) training phase and (ii) data detection phase. In the training phase the channel response is acquired by one of the well-known strategies, e.g. by means of training sequences, or pilot tones, or by blind acquisition. The channel response is, then compared to a target response set by the system designer, and if necessary, channel adjustment coefficients are determined next. The determined adjustment coefficients are then used in the second, data detection phase, resulting in an effective shortening of the original channel response. In time-varying channels, the training phase is repeated as often as the channel condition (response) is changed sufficiently so as to warrant additional adjustment to the target response.

Figure 3:
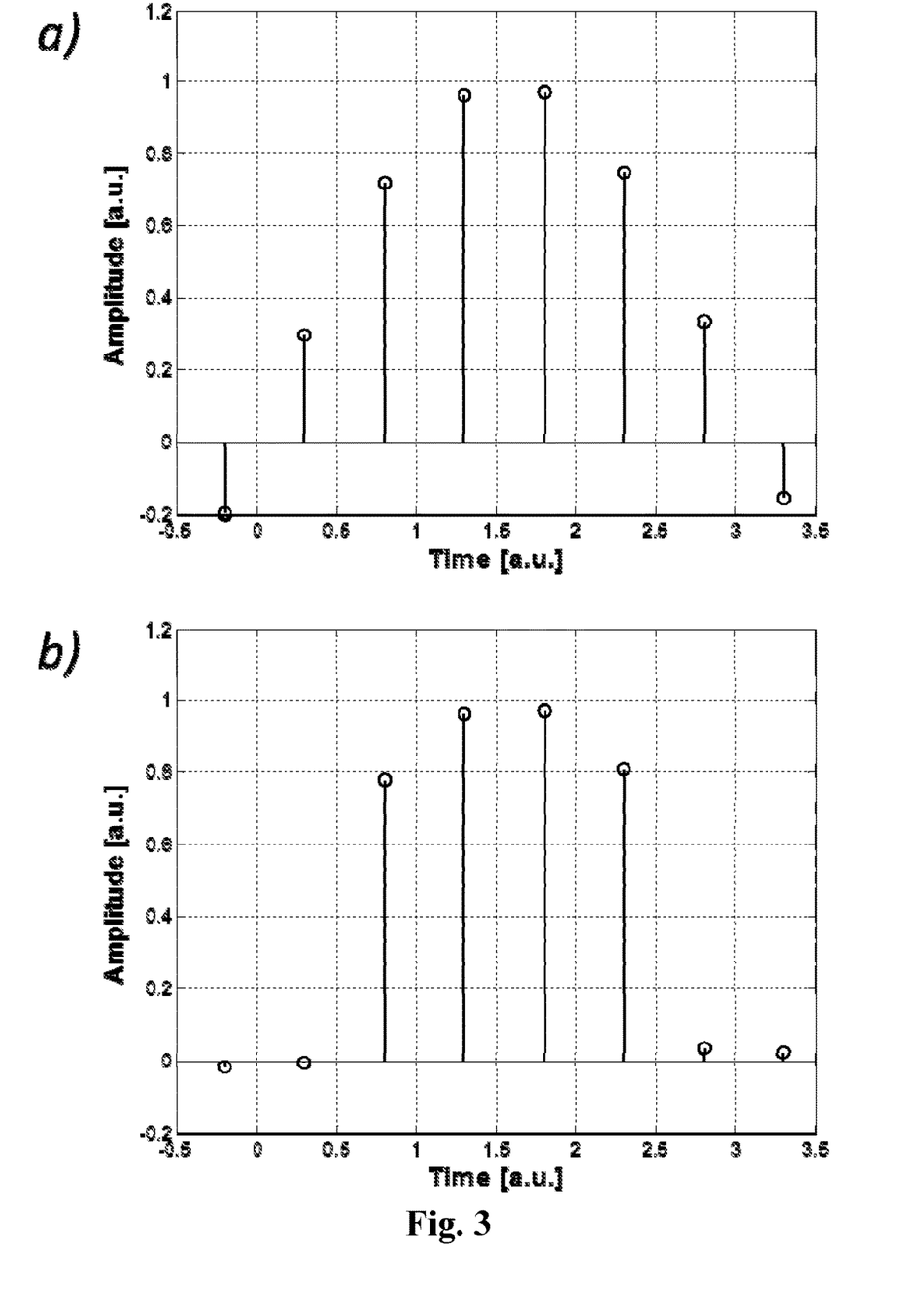
FIG. 3 shows an example of an outcome of channel response reshaping.

FIG. 3 shows an example of the channel response adjustment. Specifically, part (a) shows a direct channel response to a single input symbol that is 8 symbol slots long. Part (b) shows an outcome of a channel response reshaping. As can be seen, after channel response adjustment, the response length is reduced to only 4 important samples (instead of the original 8), allowing a 16-fold simpler information retrieving equalizer utilization (for a binary input alphabet).

Figure 4:
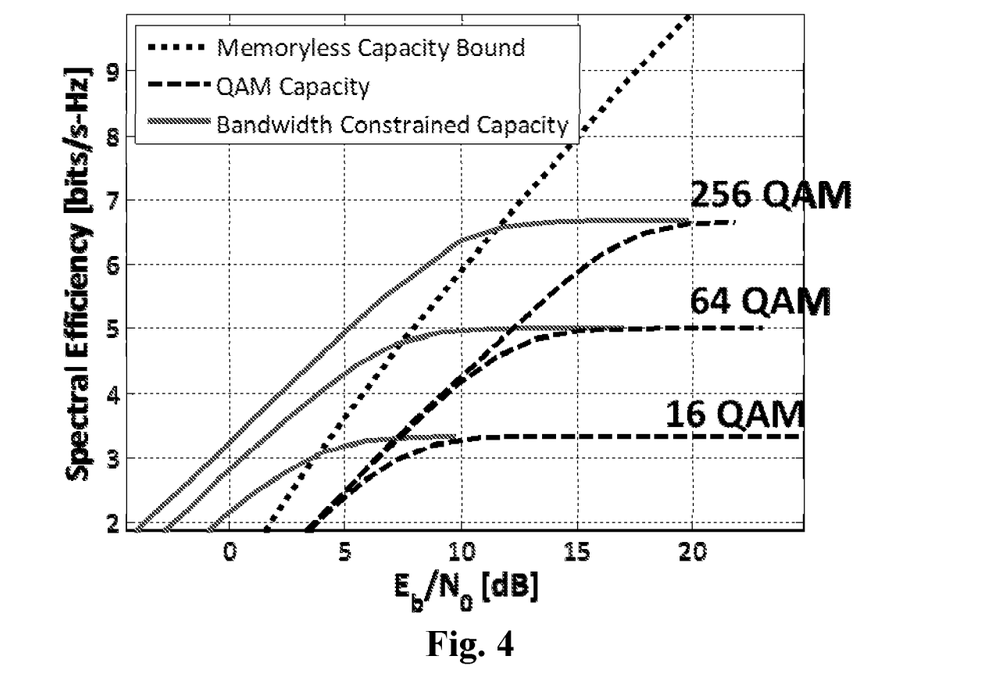
FIG. 4 illustrates an improved performance of the bandwidth constrained system in the embodiment described in this invention (in solid lines), compared to performance of standard QAM systems (dashed lines), for same instances of spectral efficiencies.

FIG. 4 illustrates an improved performance of the bandwidth constrained system in the embodiment described in this invention (in solid lines), compared to performance of standard QAM systems (dashed lines), for same instances of spectral efficiencies.

Accordingly, one aspect of the invention is an apparatus comprising a transmitter which contains a plurality of elements including:

(a) an error control code encoder used to append redundant information so as to avail information symbols' retrieval in the presence of noise and impairments, wherein the code is designed for attainment of performance closer to the constrained bandwidth channel capacity; and (b) a receiver comprising a plurality of elements conducive to the retrieval of the transmitted information symbols, including an information retrieving equalizer and an error control decoder for the code employed in the transmitter;

wherein the apparatus is for use in a digital communication system conveying information symbols at a certain symbol rate in which the information bearing waveforms are filtered to a bandwidth significantly narrower than the communication symbol rate; and wherein the apparatus achieves an improved performance and/or an increased efficiency in information transmission in a bandwidth-constrained communication system as compared with systems not employing the bandwidth constraint.

In one alternative the transmitter contains a plurality of error control encoders and the receiver contains a plurality of decoders, corresponding to the encoders in the transmitter, availing the retrieval of information symbols. In another alternative the apparatus further comprises one or more code interleavers at the transmitter used to successively, in parallel, or both successively and in parallel encode the information symbols prior to transmission designed so as to reach the capacity of the channel with memory and further comprising one, or more code de-interleavers in the receiver, undoing the interleaving action performed at the transmitter, on the course of the process of information symbols detection. In yet another alternative the apparatus further comprises a receiving filter. In still another alternative the receiver further comprises a transmission impairments mitigating equalizer. In still another alternative the receiver further comprises a channel response shortening equalizer to attain improved performance. In still another alternative the information retrieving equalizer outputs the reliability estimates, often referred to as the soft information, as to the information symbols. In still other alternatives, the information retrieving equalizer functions as a maximum a posteriori equalizer, as a trellis-based equalizer, as a sliding window variation of a maximum a posteriori equalizer, or as a sliding window variation of a soft output equalizer or takes advantage of per survivor processing.

Another aspect of the invention is a communication system incorporating the apparatus as described above that employs iterative detection, wherein the information retrieving equalizer can output likelihood estimates (often referred to as soft information) on the received symbols and pass it on to the error control decoders with those (i.e. the equalizer and the decoder(s)) iteratively exchanging their estimates on the received information for a number of times.

Yet another aspect of the invention is a communication system incorporating the apparatus as described above wherein the receiver employs error control code symbol detection by a numerical optimization procedure.

Yet another aspect of the invention is a communication system incorporating the apparatus as described above wherein the receiver employs joint channel and error control code symbol detection by a numerical optimization procedure.

Yet another aspect of the invention is a communication system incorporating the apparatus as described above wherein in the receiver employs joint channel and error control code symbol detection by a combination of iterative decoding and a numerical optimization procedure.

While the present invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The following patents and patent application publications are cited. These patents and patent application publications are not necessarily prior art: U.S. Pat. No. 8,155,530 (Alic); U.S. Pat. No. 7,012,974 B1 (Liu); U.S. Pat. No. 4,888,775 A (Karabed); U.S. Pat. No. 7,257,172 B2 (Okamoto); EP 0677965 A2 (Kim); WO 2013101583 A1 (Yu); US 20130332790 A1 (Lu); US 20120213267 A1 (Stojanovic); U.S. Pat. No. 7,205,912 B1 (Yang); US 20030161062 A1 (Akamatsu); U.S. Pat. No. 7,852,965 (Feller); WO 2005015750 A1 (Kluger); U.S. Pat. No. 6,377,529 (Lee); U.S. Pat. No. 5,430,744 (Fettweis); U.S. Pat. No. 7,839,924 (Yamaguchi); U.S. Pat. No. 6,385,255 (Fan); U.S. Pat. No. 5,757,855 (Jaffe); US20130332790 A1 (Lu); WO2010066778 A1 (Theis); U.S. Pat. No. 7,180,955 (Gatherer); U.S. Pat. No. 6,269,129 B1 (Rhee); and U.S. Pat. No. 8,595,590 B1 (Vojcic).

The following non-patent publications are cited. These non-patent publications are not necessary prior art: Tom V. Souvignier, Mats Öberg, Paul H. Siegel, Robert E. Swanson, Jack K. Wolf, "Turbo Decoding for Partial Response Channels" IEEE TRANSACTIONS ON COM-MUNICATIONS, VOL. 48, NO. 8, (2000); S. Benedetto, D. Divsalar, G. Montorsi, F. Pollara, "A Soft-Input Soft-Output APP Module for Iterative Decoding of Concatenated Codes", IEEE COMMUN. LETT., VOL. 1, NO. 1, (1997); and L. Bahl, J. Cocke, F. Jelinek, and J. Raviv, "Optimal Decoding of Linear Codes for minimizing symbol error rate", IEEE Transactions on Information Theory, vol. IT-20(2), pp. 284-287, (1974).

ADVANTAGES OF THE INVENTION

The present invention provides a receiver design and system suitable for use in an environment involving bandwidth constraint with lower complexity, latency, and power dissipation. By an appropriate combination of equalization and error control coding, the overall system performance and capacity are improved. The invention is based on a completely new insight, based on a novel theoretical finding that implies a superior performance than suspected ever before. The previous constructs do not come close to the predictions of the new theory.

The present invention possesses industrial applicability as a receiver design with improved performance in a bandwidth-constrained environment and as a method for use of the receiver design.

The method claims of the present invention provide specific method steps that are more than general applications of laws of nature and require that those practicing the method steps employ steps other than those conventionally known in the art, in addition to the specific applications of laws of nature recited or implied in the claims, and thus confine the scope of the claims to the specific applications recited therein. The method steps require the use of specific hardware and involve specific processes involving the hardware that generate a change in physical state of the hardware.

The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein.

It is also to be understood that the above description is intended to be illustrative and not restrictive. Many embodiments will be apparent to those of in the art upon reviewing the above description. The scope of the invention should therefore, be determined not with reference to the above description, but should instead be determined with reference to the appended claims, along with the full scope of equivalents to which such claims are entitled. The disclosures of all articles and references, including patent publications, are incorporated herein by reference.

What is claimed is:

1. A bandwidth restricted communication system, comprising:

an error control encoder of a transmitter comprising code, wherein the code is used to append error-control redundant symbols onto information comprised in waveforms to form appended waveforms;

a pulse-shaping element of the transmitter that intentionally introduces memory onto the appended waveforms to form bandwidth-constrained waveforms for transmission over a bandwidth-constrained channel; and a receiver that receives the bandwidth-constrained waveforms, comprising:
an information retrieving equalizer that retrieves the information from the bandwidth-constrained waveforms; and
an error control decoder that decodes the code used by the error control encoder of the transmitter;

wherein:
the error control encoder is designed in conjunction with the memory introduced into the waveforms at the pulse-shaping element;
the error control encoder and the error control decoder are matched to the bandwidth-constrained channel;
the bandwidth restricted communication system is for use in digital communication systems conveying information symbols at a certain symbol rate in which the information bearing bandwidth-constrained waveforms are filtered to a bandwidth narrower than the communication symbol rate; and
the memory introduced into the appended waveforms and the error control encoder achieve an improved system performance in information transmission compared with systems not employing the bandwidth constraint, not employing memory, and not having the error control encoder and the error control decoder matched to the bandwidth-constrained channel.

2. The bandwidth restricted communication system of claim 1, wherein the error control encoder forms the appended waveforms using a low-density parity check code.

3. The bandwidth restricted communication system of claim 1, wherein the error control encoder forms the appended waveforms using a turbo code with parallel concatenation.

4. The bandwidth restricted communication system of claim 1, wherein the information retrieving equalizer is a Bahl, Cocke, Jelinek and Raviv (BCJR) equalizer.

5. The bandwidth restricted communication system of claim 1, wherein the information retrieving equalizer is a soft output Viterbi detector.

6. The bandwidth restricted communication system of claim 1, wherein the information retrieving equalizer accommodates for correlated noise in the bandwidth-constrained waveforms.

7. The bandwidth restricted communication system of claim 1, wherein the receiver further comprises a noise whitening filter to accommodate for correlated noise, and the noise whitening filter precedes the information retrieving equalizer.

8. The bandwidth restricted communication system of claim 1, wherein the receiver further comprises a response shortening processor preceding the information retrieving equalizer.

9. The bandwidth restricted communication system of claim 8, wherein the response shortening processor is a finite impulse response filter.

10. A method comprising:
providing a plurality of waveforms in a transmitter, wherein the waveforms comprise information;
appending the information comprised in the waveforms with error-control redundant symbols using code comprised in an error control encoder of the transmitter to form appended waveforms;
shaping the appended waveforms using a pulse-shaping element of the transmitter that intentionally introduces memory onto the appended waveforms to form bandwidth-constrained waveforms;
transmitting, by the transmitter, the bandwidth-constrained waveforms over a bandwidth-constrained channel;
retrieving the information from the bandwidth-constrained waveforms using an information retrieving equalizer of a receiver; and
decoding the code employed by the error control encoder of the transmitter using an error control decoder of the receiver;

wherein:
the error control encoder is designed in conjunction with the memory introduced into the waveforms at the pulse-shaping element;
the error control encoder and the error control decoder are matched to the bandwidth constrained channel;
the method is for use in digital communication systems conveying information symbols at a certain symbol rate in which the information bearing bandwidth-constrained waveforms are filtered to a bandwidth narrower than the communication symbol rate; and
the memory introduced into the appended waveforms and the error control encoder achieve an improved system performance in information transmission compared with systems not employing the bandwidth constraint, not employing memory, and not having the error control encoder and the error control decoder matched to the bandwidth-constrained channel.

11. The method of claim 10, wherein the error control encoder forms the appended waveforms using a low-density parity check code.

12. The method of claim 10, wherein the error control encoder forms the appended waveforms using a turbo code with parallel concatenation.

13. The method of claim 10, wherein the information retrieving equalizer is a Bahl, Cocke, Jelinek and Raviv (BCJR) equalizer.

14. The method of claim 10, wherein the information retrieving equalizer is a soft output Viterbi detector.

15. The method of claim 10, wherein the information retrieving equalizer accommodates for correlated noise.

16. The method of claim 10, wherein the receiver further comprises a noise whitening filter to accommodate for correlated noise, and the noise whitening filter precedes the information retrieving equalizer.

17. The method of claim 10, wherein the receiver further comprises a response shortening processor preceding the information retrieving equalizer.

18. The method of claim 17, wherein the response shortening processor is a finite impulse response filter.

* * * * *